US012056667B1

(12) United States Patent
Lee

(10) Patent No.: US 12,056,667 B1
(45) Date of Patent: Aug. 6, 2024

(54) SYSTEM FOR MANAGING APPROVAL REQUEST USING EMAIL AND THE OPERATING METHOD THEREOF

(71) Applicant: Young Oak Lee, Songpa-gu (KR)

(72) Inventor: Young Oak Lee, Songpa-gu (KR)

( * ) Notice: Subject to any disclaimer, the term of this patent is extended or adjusted under 35 U.S.C. 154(b) by 0 days.

(21) Appl. No.: 18/597,368

(22) Filed: Mar. 6, 2024

(30) Foreign Application Priority Data

Mar. 13, 2023 (KR) .................. 10-2023-0032369
May 4, 2023 (KR) .................. 10-2023-0058658
Aug. 9, 2023 (KR) .................. 10-2023-0104210

(51) Int. Cl.
 *G06Q 10/107* (2023.01)
(52) U.S. Cl.
 CPC ....... *G06Q 10/107* (2013.01); *G06Q 2250/40* (2013.01); *G06Q 2250/50* (2013.01)
(58) Field of Classification Search
 CPC ............ G06Q 10/107; G06Q 2250/50; G06Q 2250/40; G06Q 2250/905; G06Q 30/0202
 USPC ................ 709/203, 206, 220, 224, 226, 227
 See application file for complete search history.

(56) References Cited

U.S. PATENT DOCUMENTS

| 8,601,022 B2 * | 12/2013 | Gropper ............. H04L 61/4505 707/796 |
| 11,888,870 B2 * | 1/2024 | Garyani ............. H04L 63/1425 |
| 11,972,013 B2 * | 4/2024 | Kirsch ................. H04L 63/105 |
| 11,973,804 B2 * | 4/2024 | Raleigh .................. H04W 8/20 |
| 2014/0025443 A1 * | 1/2014 | Onischuk ............... G07C 13/00 705/12 |
| 2014/0365281 A1 * | 12/2014 | Onischuk ............... G07C 13/00 705/12 |
| 2015/0012339 A1 * | 1/2015 | Onischuk ............... G07C 13/00 235/386 |
| 2018/0350180 A1 * | 12/2018 | Onischuk ............... G07C 13/00 |
| 2018/0351080 A1 * | 12/2018 | Bak ........................ H10N 50/80 |
| 2022/0063883 A1 * | 3/2022 | Mott ...................... B65D 55/02 |

FOREIGN PATENT DOCUMENTS

| CA | 3113246 C | * | 6/2022 | .......... G06F 16/904 |
| CN | 101330592 A | * | 12/2008 | ....... H04N 21/25875 |
| KR | 10-2015-0084585 A | | 7/2015 | |
| KR | 10-2018-0129375 A | | 12/2018 | |

OTHER PUBLICATIONS

Written Decision on registration for Korean Patent Application No. KR 10-2023-0104210 dated Oct. 10, 2023.

* cited by examiner

*Primary Examiner* — Khanh Q Dinh
(74) *Attorney, Agent, or Firm* — Sughrue Mion, PLLC

(57) ABSTRACT

The various embodiments of the present invention pertain to a method for operating a system for managing approval requests using email.

4 Claims, 16 Drawing Sheets

FIG. 6

| Template number | Template name | Template description | Date Created |
|---|---|---|---|
| TEM-1 | General 1 | Draft document approval request template | 2022-11-20 |
| TEM-2 | General 2 | Urgent work approval request template | 2022-12-22 |
| TEM-3 | Automation integrations | System automation integration approval request | 2023-01-14 |
| TEM-4 | Integration with other systems | IT case management integration approval request | 2023-02-09 |

Generating a new template

FIG. 7

| Case number (Automatically generated) | Approval requester (Automatically generated) | Authorizer: Selection menu |
|---|---|---|
| Case template: Selection menu | | Date Created : (Automatically generated) |

B104, B106, B106, B108, B110

| Mail subject | Manually entered by the approval requestor | |
|---|---|---|
| Mail body | Direct input by the approval requestor | |
| Approval Response Menu | Accept approval request | Selection Menu (Auto-generated) — B116 |
| | Pending approval request | |
| | Reject request | |
| | Hyperlink (auto-generated) | Approval management server URL + approval request case number + approval response + authorizer's name |
| Automation playbook | Selection menu — B124 | Auto-generate |
| Attachments | Approval requestor attaches file | |

| Module number | Module name | Automation Tasks |
|---|---|---|
| AP-1 | IT Case Management | Automatically perform tasks with a system task number in an approval case through the IT case management system |
| AP-2 | Mailings | Transmit approval and task completion messages to the requester by email |
| AP-3 | Transmit API tasks | Identify target system via system number and execute forwarded commands |
| AP-4 | Work with other systems 1 | Provide the status of the requested case to other systems via APIs |
| AP-5 | Work with other systems 2 | Provide the status of the requested case to the requesting system via API and notify the target system administrator via email |
| DF-1 | Select an interval | Every 10 minutes, every 30 minutes, every hour |
| DF-2 | Select number of times | 3 times, 5 times, 10 times |
| DF-3 | No answer | Treats the request as a denial and performs the same actions as a denied request |
| DN-1 | Change case status | Change the status of the approved case to rejected |
| DN-2 | Mail notification | Transmit a rejection email to the requester by email |

FIG. 9

| Playbook Number | Scenario name | Playbook Description | Date Created |
|---|---|---|---|
| PN-1 | Authorizer's response 1 | Provide authorizer with a pending approval menu | 2022-11-20 |
| PN-2 | Authorizer's response 2 | Provide authorizer with an Approve/Deny menu | 2022-12-22 |
| PN-3 | Automation integration 1 | Request approval for system automation integration | 2023-01-14 |
| PN-4 | Integrate with other systems | Request approval for IT case management integration | 2023-02-09 |

FIG. 10

| Playbook Number : PN-1 | Playbook Name : Authorizer's response 1 | Date Created : 2022-11-20 |
|---|---|---|
| Playbook description: Provide authorizer with a pending approval menu ||||

| Authorizer's response | Automating tasks | Last tasks |
|---|---|---|
| Accept approval request | ● AP-1: Automate the task of the system work number of the approval case through the IT case management system | ● AP-2: Sends approval and work completion messages to the approval requestor by e-mail |
| Pending approval request | ● DF-1: Every hour<br>● DF-2: Send a total of 3 encouragement emails | ● DF-3: Considers the request as rejected and performs the same action as rejecting the request |
| Deny a request | ● DN-1: Change approval case status | ● DN-2: Send a rejection email to the requestor by email |

FIG. 11

| Case Number | Authorizer's name | Case description | Date Created |
|---|---|---|---|
| APR-1 | Director Ruda Lee | February 14 Web server system work | 2023-02-03 |
| APR-2 | Director Ruda Lee | Work on failure number 20230302-03 | 2023-02-14 |
| APR-3 | Director Rumi Lee | Existing system upgrade work | 2023-02-18 |
| APR-4 | Director Ruda Lee | February 21 Network work | 2023-02-18 |

FIG. 12

| Case number: APR-4 | Approval Requested by: Young Oak Lee on behalf of | Approved By: Director Ruda Lee |
|---|---|---|
| Case Template: TEM-1 General Business 1 | | Generation date : 2023-02-18 |

| | | | |
|---|---|---|---|
| Mail subject | Approval request for system job number SYS-20230301-05 | | — K112 |
| Mail body | As a follow-up to system failure case SOL-20230215-02, an upgrade of the target system is required, as shown in the attached work plan.<br>Requesting approval for this. | | — K114 |
| | Selection Menu — K116 | Hyperlink | — K118 |
| Approval Response Menu | Accept approval request | Approval Management Server URL + Approval Request Case Number + Approval Response + Authorizer's Name | |
| | Pending approval request | | |
| | Reject request | Provide the Authorizer with a pending approval menu | — K120 |
| Automation Playbook | PN-1 | | — K122 |
| Attachments | Workplan.docx | | — K124 |
| Case descriptions | February 21 Network tasks | | — K128 |
| Approval request results | Automatic status change — K126 | Request result time | |
| Automation task progress | Automatic status change — K130 | Task progress time | — K132 |

| Email subject | Enter a subject that is relevant to the approval request — R102 |
|---|---|
| Email body | Enter the body content related to the approval request — R104 |
| | Click the hyperlinked text (menu) to indicate that you want to accept the request, hold the request, or deny the request — R106 |
| | Hyperlinked menu (the terms and number of menus can be modified in the approval request template as needed, as well as the position of the menu, such as top or bottom) |
| | <u>Accept approval request</u>   <u>Pending approval request</u>   <u>Deny approval request</u> — R108 |

FIG. 14

| Email subject | Enter a subject that is relevant to the approval request |
|---|---|
| Email body | Enter the body content related to the approval request<br><br>Click the hyperlinked text (menu) to indicate that you want to accept the request, hold the request, or deny the request<br><br>Hyperlinked menu (the terms and number of menus can be modified in the approval request template as needed, as well as the position of the menu, such as top or bottom)<br><br>S102<br><br>Accept approval request      Deny approval request |

FIG. 15

| T102<br>Example of an authorizer selection menu | T104<br>Menu-specific hyperlink syntax | T106<br>Menu-specific hyperlink example |
|---|---|---|
| Accept approval request | ● Approval Management Server URL + Approval Request Case Number + Approval Response + Authorizer's Name<br>● The content of the approval response may vary depending on the menu | ● https://rumida.co/?case_num=APR-42?value=Aprovd?replied=YoungOak_Lee<br>● The value of the approval response can be Approved, Denied, or Pending, depending on the menu. |
| Pending approval request | | |
| Deny a request | | |

FIG. 16 https://rumida.co/?case_num=APR-42?value=Aprroved?replied=YoungOak_Lee

Success!

To customize this response, check out our docs here

SYSTEM FOR MANAGING APPROVAL REQUEST USING EMAIL AND THE OPERATING METHOD THEREOF

CROSS-REFERENCE TO RELATED APPLICATION

This application claims priority to and the benefit of Korean Patent Application No. 10-2023-0032369 filed on Mar. 13, 2023, Korean Patent Application No. 10-2023-0058658 filed on May 4, 2023, and Korean Patent Application No. 10-2023-0104210 filed on Aug. 9, 2023, the entire disclosures of which are incorporated herein by reference.

BACKGROUND

1. Field of the Invention

This application is concerned with methods and systems for clarifying communication and approval processes between approval requesters and authorizers. Specifically, this application pertains to methods and systems for automatically performing tasks from an automation playbook selected in an approval request, in accordance with the results of that request.

2. Description of the Related Art

In the modern business environment, the approval process is a critical workflow. Often, obtaining approvals requires cumbersome tasks such as engaging in discussions with others, passing documents, and filling out forms. These processes are inefficient, time-consuming, and prone to errors.

Meanwhile, email has been frequently used since the invention of the internet and, especially in official documents, the contents of emails can carry legal effect. Although email is the most universally used means of communication in corporations, the lack of change or development due to compatibility issues with various email client programs has led to decreased user convenience.

In corporate settings, the method of requesting and receiving approvals through email involves writing a description of the approval request in the email body, to which the authorizer's responds in kind with approval or denial. However, the wording used by the authorizer can lead to ambiguous interpretations of the outcome and is particularly cumbersome to handle on smaller devices like mobile phones, detracting from work efficiency.

Additionally, because the authorizer writes the result of the approval request in the email body, it is difficult to automate subsequent tasks according to the approval results, presenting a disadvantage that necessitates the use of separate approval management software.

SUMMARY OF THE INVENTION

The present invention aims to alleviate the complexities inherent in the traditional approval request management processes. The email-based approval request management system provided herein enables the sending of requests through a simplified form and allows authorizers to process these requests via email. This simplification of the approval request process results in enhanced convenience in handling tasks.

Additionally, while the email approval management system of the present invention can function independently, it can also be implemented in conjunction with a case management system that possesses case management capabilities. This allows for the system's operations to be performed more easily without the need to implement the entire system configuration.

The operation method of the system for managing approval requests using emails according to the various embodiments of the present invention comprises the following steps: by a user device, generating an approval request case at an approval management server using information entered by a user and transmitting it to an authorizer's device; by the authorizer's device, sending a response to the approval request case from the authorizer to the approval management server; by the approval management server, determining whether the received result is a request denial, request pending, or request approval; by the approval management server, if the result is a request denial, sending an email to the user device that includes notification of the denied approval request; by the approval management server, if the result is a request pending, transmitting an email to the authorizer's device at preset intervals with a prompt for approval; by the approval management server, if the result is a request approval, performing automated tasks requested in the approval request case, wherein, in the event that the approval management server receives an email approval request case from the user device, the system is configured to generate a response menu within the interface displayed on the authorizer device's screen. This response menu includes a hyperlink structured as follows: "approval management server URL+approval request case number+approval response+authorizer's name". This hyperlink facilitates direct interaction with the approval management server for efficient processing of the approval request.

In the method for managing email approval requests in a system according to various embodiments, the steps include: by a second system, creating an email approval request case using predefined API (Application Programming Interface) messages between the approval management server and the second system, and transmitting it to the authorizer's device; API messages originating from the second system can be triggered by the user device or by the system's own cases or events, for instance, an IT case management system may send an approval request message to the approval management server via API message when an email approval request is needed during case handling, and receive the results of such request, or if the second system is an IT automation system, it can obtain authorization from the authorizer through the approval management server before performing predefined automated tasks; by the authorizer's device, transmitting the response to the approval request case back to the approval management server; by the approval management server, determining whether the received result is a request denial, request pending, or request approval; by the approval management server, if the result is a request denial, sending a notification via API message to the second system that the approval request has been denied; if the result is a request pending, sending an email at preset intervals to the authorizer's device urging approval; if the result is a request approval, performing the requested tasks; and by the approval management server, using API messages to notify the second system of the approval or to transmit the results of the automated process related to the request, wherein, upon receiving an email approval request case from a secondary system, the approval management server generates a response menu within the interface presented on the authorizer's device display, which includes a hyperlink structured as "approval management server URL+approval request case number+approval response+authorizer's name".

In a system for managing email approval requests, the method includes the following steps: by the user device, the user inputs the authorizer's name and subject into the email's subject line, composes the body content, and sends it to the email address of the approval management server; the approval management server, upon receiving the email, generates a basic approval request case and transmits it to the authorizer's device; the approval management server, if the email subject sent from the user device contains specific words like [Template], [Playbook], [Authorizer], [Usage], or if the information in the email sent by the user device is insufficient to create an approval request case, it sends a reply email to the user device including a list of case templates, automation playbook lists, and authorizer lists that can be used to create an approval request case; the approval management server, if the information in the email sent by the user device is sufficient to create an approval request case, proceeds to create and transmit it to the authorizer's device; the authorizer's device, upon receiving the case, inputs a response to the approval request case and sends it back to the approval management server; the approval management server then verifies whether the response is a request denial, pending, or approval; if denied, the server sends an email to the user device indicating the rejection; if pending, the server periodically sends prompts for approval to the authorizer's device; if approved, the server executes the automated tasks requested in the approval request case.

In accordance with one embodiment of the present invention, a method is provided comprising a step of generating an automation playbook within an email approval request case. Said automation playbook, which is selected by the approval requester during the creation of the approval request case, encompasses a sequence of tasks designated to be automatically executed by the approval management server contingent upon the approver's response. The automation playbook is constituted of a plurality of modules, each module epitomizing a discrete task executable by the server. These modules are crafted by administrators employing scripting languages or software programs, with each module being accorded a distinct identifier and appellation for selection within the automation playbook. The tactical amalgamation of said modules constitutes the automation playbook, thereby enabling the facilitation of subsequent process automation in alignment with the authorizer's response. Each module operates as a selectable unit within the playbook, with identifiers and appellations conferred either by an administrator or generated autonomously, said identifiers and appellations reflective of the particularized tasks they are purposed to execute.

In various embodiments of this application's system for managing approval requests via email, the system includes a user device, an authorizer's device, and an approval management server. The user device generates an email approval request case at the approval management server using information entered by the user and then transmits it to the authorizer's device. The authorizer's device sends back to the approval management server the authorizer's response to the approval request case. The approval management server confirms whether the received result is a request denial, a request pending, or a request approval. If the result is a request denial, the approval management server sends an email to the user device including notification of the denial. If the result is a request pending, it sends emails at preset intervals to the authorizer's device urging for approval. Finally, if the result is a request approval, the server performs the automated tasks that were requested in the approval request case, wherein, when the approval management server receives an email approval request case from a user device, it generates a response menu featuring a hyperlink within the displayed interface on the authorizer's device. The hyperlink is formatted as "approval management server URL+approval request case number+approval response+authorizer's name".

BRIEF DESCRIPTION OF THE DRAWINGS

In accordance with an embodiment of the current invention, the brief description of the drawings is as follows:

FIGS. 6 and 7 depict approval request case templates as shown in the administrator interface of the approval management server, according to an embodiment.

FIGS. 8 through 10 illustrate automation playbook as shown in the administrator interface of the approval management server, in one embodiment.

FIGS. 11 and 12 show interfaces where, in an embodiment, a user logs into the approval management server to create and manage approval request cases.

FIGS. 13 through 15 display the composition of emails sent to the authorizer through approval request cases.

FIG. 16 demonstrates an example of how hyperlink information is conveyed through a web browser when the authorizer selects an example menu item, in one embodiment.

Figure 1:
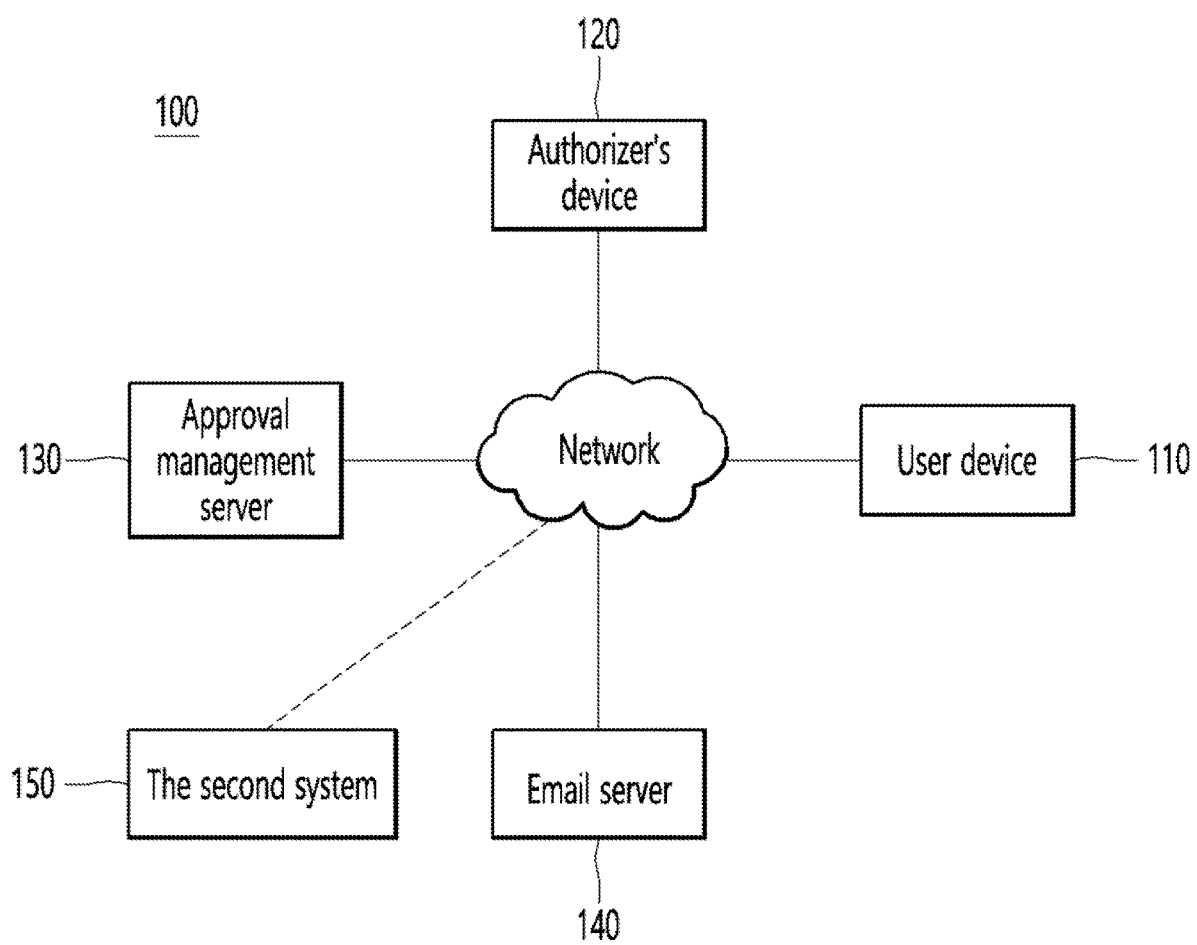
FIG. 1 is an exemplary configuration diagram of a system for managing approval requests via email, as per various embodiments of the present application.

The aforementioned diagrams are provided as examples to ensure that the concept of the invention is sufficiently conveyed to those skilled in the art. Therefore, the invention should not be construed as limited to the drawings presented and may be embodied in various other forms. Additionally, the same reference numbers throughout the specification denote the same elements. It should also be noted that the drawings are not necessarily to scale; specific parts may be exaggerated or minimized for clarity.

DETAILED DESCRIPTION OF THE INVENTION

Various embodiments are now described with reference to the accompanying drawings. This specification provides multiple explanations to facilitate an understanding of the invention. However, it is clear that these embodiments could be implemented even without these specific descriptions.

The terms used in this specification, such as "component," "module," "system," refer to computer-related entities, whether in the form of hardware, firmware, a combination of software and hardware, or software execution. For instance, the term "component" can refer to a variety of entities such as a process operating on a processor, the processor itself, an object, an executable thread, a program, or even the computer as a whole. However, these examples are not exhaustive, and the term could encompass a broader range of items.

For example, an application running on an electronic device and the device itself can both be considered as components. Multiple components may reside within a processor and/or an executable thread. A single component can be localized within one computer or distributed across more than two computers. Additionally, these components can be executed from various computer-readable mediums that contain different data structures. Components can communicate through local and/or remote processing by way of signals that carry data packets, such as data from a component interacting with other components within a local or distributed system, or data transmitted across networks like the internet.

Furthermore, the term "or" is intended to mean an inclusive "or" rather than an exclusive "or". That is, unless specifically stated otherwise or clear from context, the phrase "X uses A or B" is intended to include any one of the natural inclusive permutations. That means X can use either A; or X can use B; or X can use both A and B, such that "X uses A or B" is applicable to each of these possibilities. Additionally, the term "and/or" as used herein refers to and encompasses any and all possible combinations of one or more of the listed items.

Additionally, the terms "includes" and "including" are to be understood as encompassing the presence of the features, integers, steps, or components referred to, but not precluding the presence or addition of one or more other features, integers, steps, components, or groups thereof. Furthermore, unless specified otherwise or clear from context, the singular forms "a," "an," and "the" as used in this specification and claims are intended to include the plural, and are interpreted to mean "one or more."

The phrase "at least one of A or B" is to be interpreted to mean any one or more of the following: the inclusion of A alone, the inclusion of B alone, or the inclusion of both A and B together.

Those skilled in the art will appreciate that the exemplary embodiments and various illustrative logical blocks, modules, circuits, methods, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The descriptions of the presented embodiments are provided to enable any person skilled in the technical field of the invention to make or use the invention. It will be apparent to those skilled in the art that various modifications to these embodiments can be made without departing from the principles and spirit of the invention. Therefore, the invention should not be limited to the described embodiments and should be interpreted within the broadest scope consistent with the principles and novel features disclosed herein.

Various embodiments described here can be implemented, for example, using computer software, hardware, or a combination thereof, in a computer-readable medium and storage medium that can be read by a computer or similar device.

In hardware implementations, the embodiments described herein can be implemented with any combination of the following: ASICs (application-specific integrated circuits), DSPs (digital signal processors), DSPDs (digital signal processing devices), PLDs (programmable logic devices), FPGAs (field-programmable gate arrays), processors, controllers, micro-controllers, microprocessors, or other electronic units designed for performing the functionality described here. In some instances, the embodiments described in the specification may be implemented as the processor itself within an electronic device.

Referring to FIG. 1, in various embodiments of the present invention, system 100 can comprise a user device 110, an authorizer's device 120, an approval management server 130, and an email server 140. Additionally, there may exist a secondary system 150 that is connected to the approval management server 130 and can generate approval request cases via API messages or perform actions on behalf of the authorizer post-approval.

The user device 110 can be broadly defined as the device used by a user, who is requesting approval. The operations of system 100 commence through the user device 110, and approval requests for specific actions can be sent via the user device 110. The authorizer's device 120 refers to the device used by the authorizer to determine the approval status in response to an approval request from the approval management server 130. The approval management server 130 can be characterized as a server capable of performing automation functions, including interfacing with other systems via web servers, databases, and an Application Programming Interface (API). The email server 140 can be referred to as the server providing email services to users and authorizers and may encompass databases that store their email-related information. Automation functions and/or tasks are defined as the processes or outcomes where a sequence of multiple modules (each module signifying a task executed by any part of the system) included in a playbook is carried out.

The second system 150 can be understood to encompass a system that is capable of transmitting an approval request to the approval management server 130 via a predefined API message, prompting the approval management server 130 to create an approval request case, and based on the outcome of the authorizer's approval request, can perform the corresponding actions within the system 100.

Figure 2:
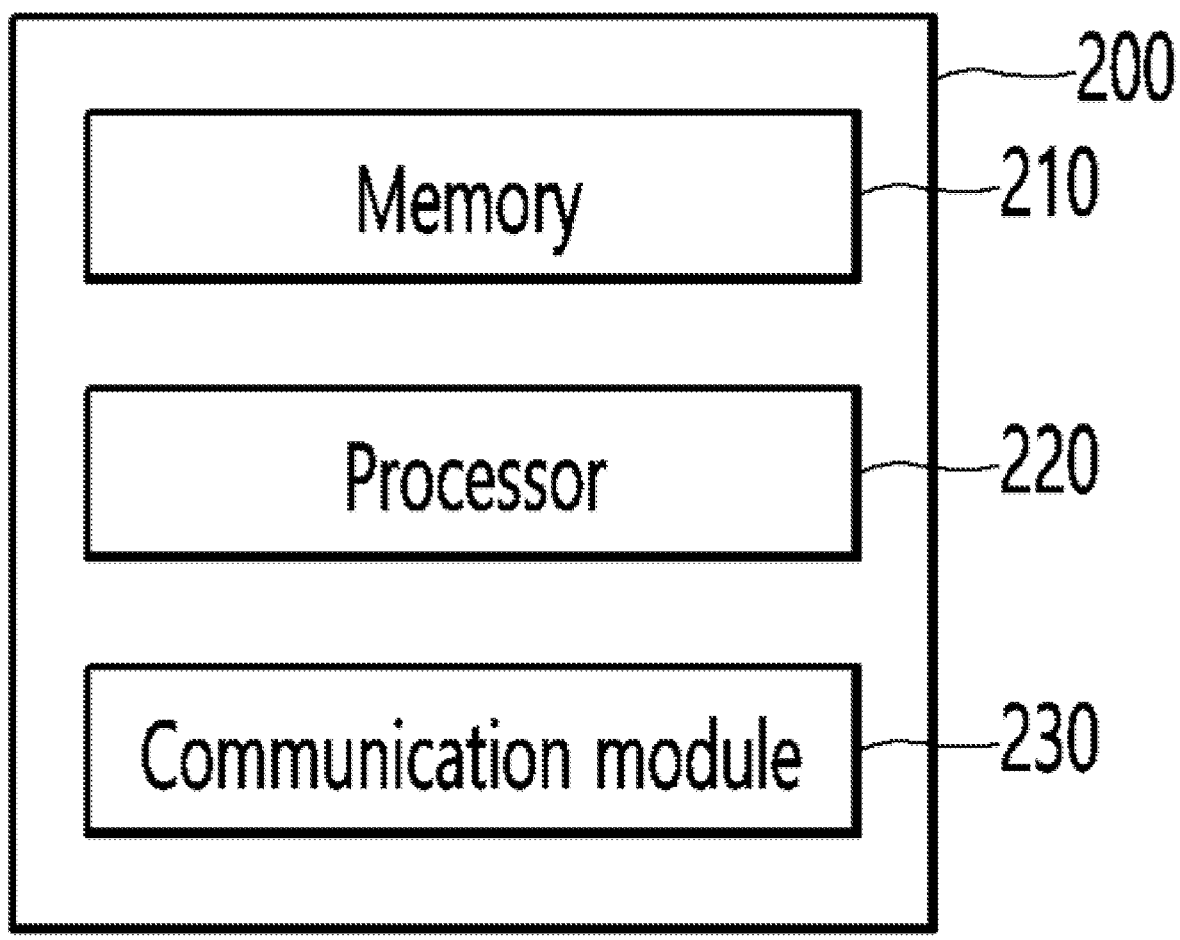
FIG. 2 illustrates an exemplary diagram of the approval management server within the system that manages approval requests using email, in accordance with various embodiments of the present application.

The configuration of the approval management server 200 shown in FIG. 2 is a simplified example. In one embodiment of the present invention, server 200 may include additional components necessary to fulfill its computing environment, and it may be constituted only by some of the disclosed components. The approval management server 200 can include a processor 210 and memory 220. The processor 210 can be composed of one or more cores and may include a central processing unit (CPU), a general-purpose graphics processing unit (GPGPU), a tensor processing unit (TPU) for data analytics and deep learning. The processor 210 is capable of executing computer programs stored in the memory 220 to perform data processing for machine learning as per an embodiment of the invention.

For example, the processor 210 is typically capable of controlling the overall operations of the approval management server 200. It processes signals, data, information received or outputted through the components examined above, or runs applications stored in memory 220, thereby providing or processing appropriate information or functionality for users.

Furthermore, the processor 210 may control at least some of the components of server 200 to run applications stored in memory 220. Additionally, for the operation of these applications, the processor 210 may coordinate and operate at least two or more components included in server 200.

In accordance with an embodiment of the present invention, the processor 210 is capable of performing computations for the training of neural networks. Processor 210 can handle tasks associated with deep learning (DL), such as processing input data for training, extracting features from input data, calculating errors, and updating the neural network weights using backpropagation. At least one of the processor 210's CPU, GPGPU, and TPU may handle the training of network functions. For instance, both the CPU and GPGPU may collaboratively process the learning of network functions and the classification of data using network functions.

According to an embodiment of the invention, memory 220 is capable of storing any form of information generated or determined by processor 210, as well as any form of information received by the network component. The memory 220 may include storage media of at least one type such as flash memory type, hard disk type, multimedia card micro type, card type memory (e.g., SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk, or optical disk. Approval management server 200 may also operate in connection with web storage on the internet, which performs the storage functions of memory 220. The description of memory provided above is exemplary and is not intended to limit the invention.

In an embodiment for creating an approval request case on the approval management server, at step 310, a user device can generate an email approval request case using information entered by a user and transmit it to an authorizer's device via the approval management server.

At step 320, the authorizer's device can send a response to the approval management server regarding the approval request case.

At step 330, the approval management server can confirm whether the received response from the authorizer is a request denial, a request pending, or a request approval.

At step 340, if the result is a request denial, the approval management server can send an email to the user device indicating that the approval request has been denied.

At step 350, if the result is a request pending, the approval management server can periodically send emails to the authorizer's device to prompt for approval.

At step 360, if the result is a request approval, the approval management server can perform operations corresponding to the automation playbook of the email approval request.

In another embodiment utilizing a secondary system, at step 410, the secondary system can generate an email approval request via API messages and transmit it to the authorizer's device through the approval management server.

At step 420, the authorizer's device can send a response to the approval management server concerning the approval request case.

At step 430, the approval management server can confirm if the response from the authorizer indicates a request denial, a request pending, or a request approval.

At step 440, if the result is a request denial, the approval management server can send a message through API to the secondary system notifying that the approval request has been denied.

At step 450, if the result is a request pending, the approval management server can send emails at predefined intervals to the authorizer's device urging approval.

At step 460, if the result is a request approval, the secondary system can perform the corresponding actions, as the approval management server can send information about the request approval to the secondary system via API messages.

In an embodiment, at step 510, the approval management server can receive a request to create an approval request case through an email from the user device. Users may send an email with the authorizer's name and subject in the title and compose the body content, addressing it to the email address of the approval management server. The server, as depicted in FIG. 12, can then generate an approval request case using pre-set default case templates K108 and default automation playbook K120 and forward it to the authorizer's device.

At step 520, the server can confirm if the information provided in the user's email is sufficient to create an approval request case.

At step 530, if the approval management server determines that the information provided by the user is insufficient for the creation of an approval request case, it can send an email to the user's device. This email includes a list of available case templates, automation playbook, and authorizers, as well as instructions on how to create an approval request case. If the user sends an email to the server's address with specific keywords like [Template], [Playbook], [Authorizer], [Usage Method] in the subject line or omits necessary information for case creation, the server can reply with a summary of available case templates, automation playbook, and a list of authorizers, along with instructions on how to create an approval request case via email.

Figure 3:
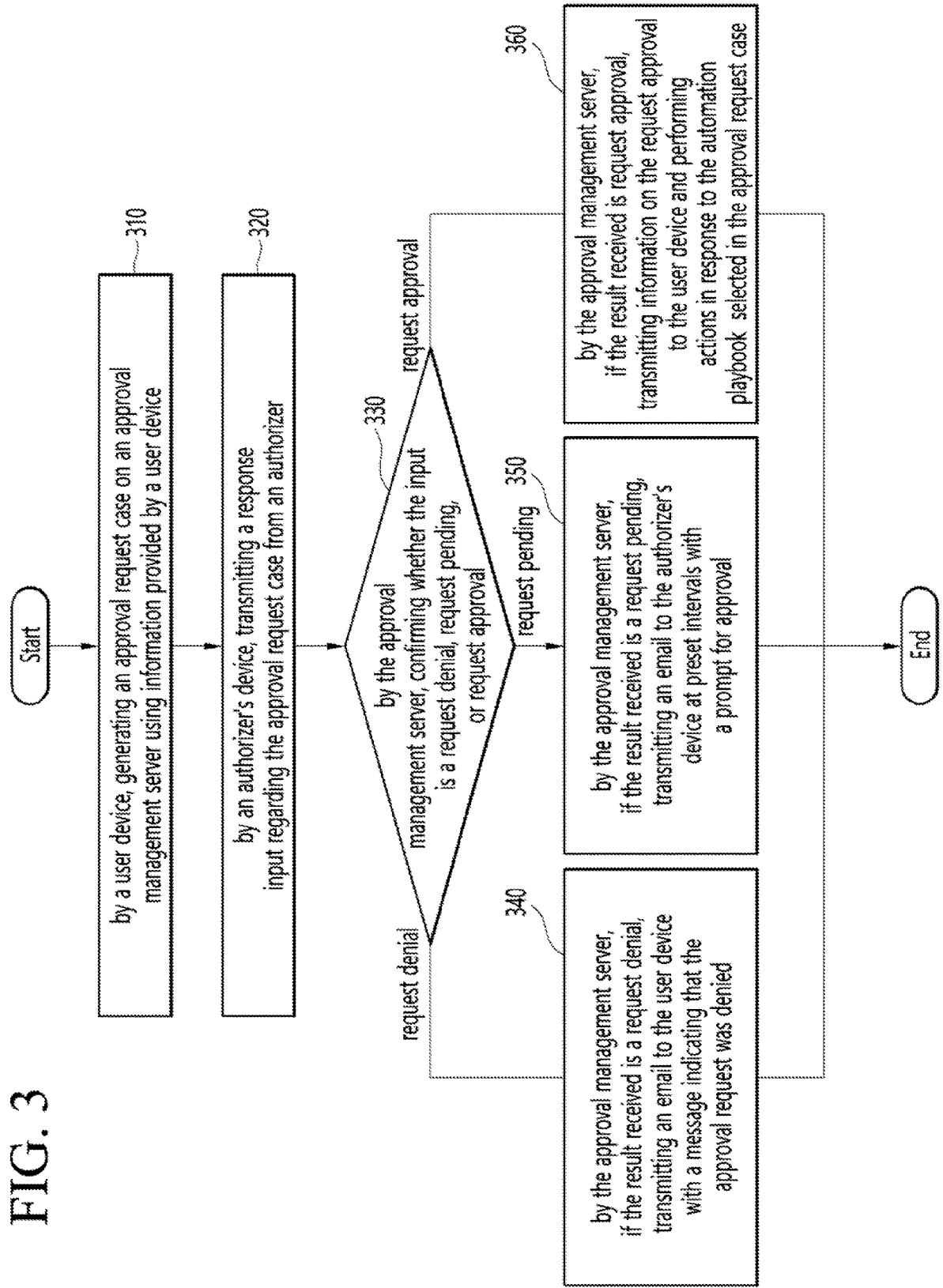
FIGS. 3 through 5 present exemplary flowcharts describing the method by which the system for managing approval requests operates, as per various embodiments of the present application.
Figure 4:
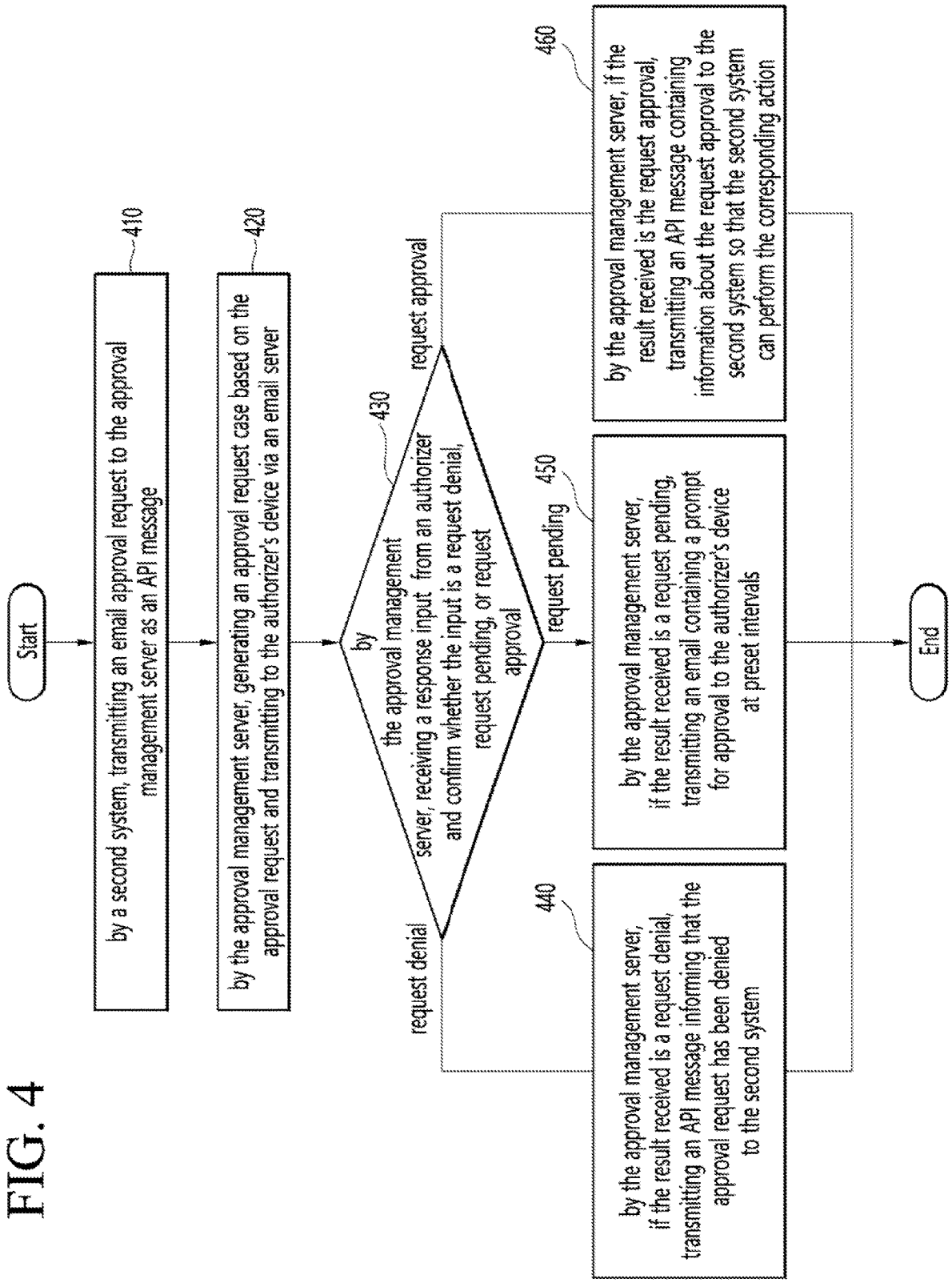
Figure 5:
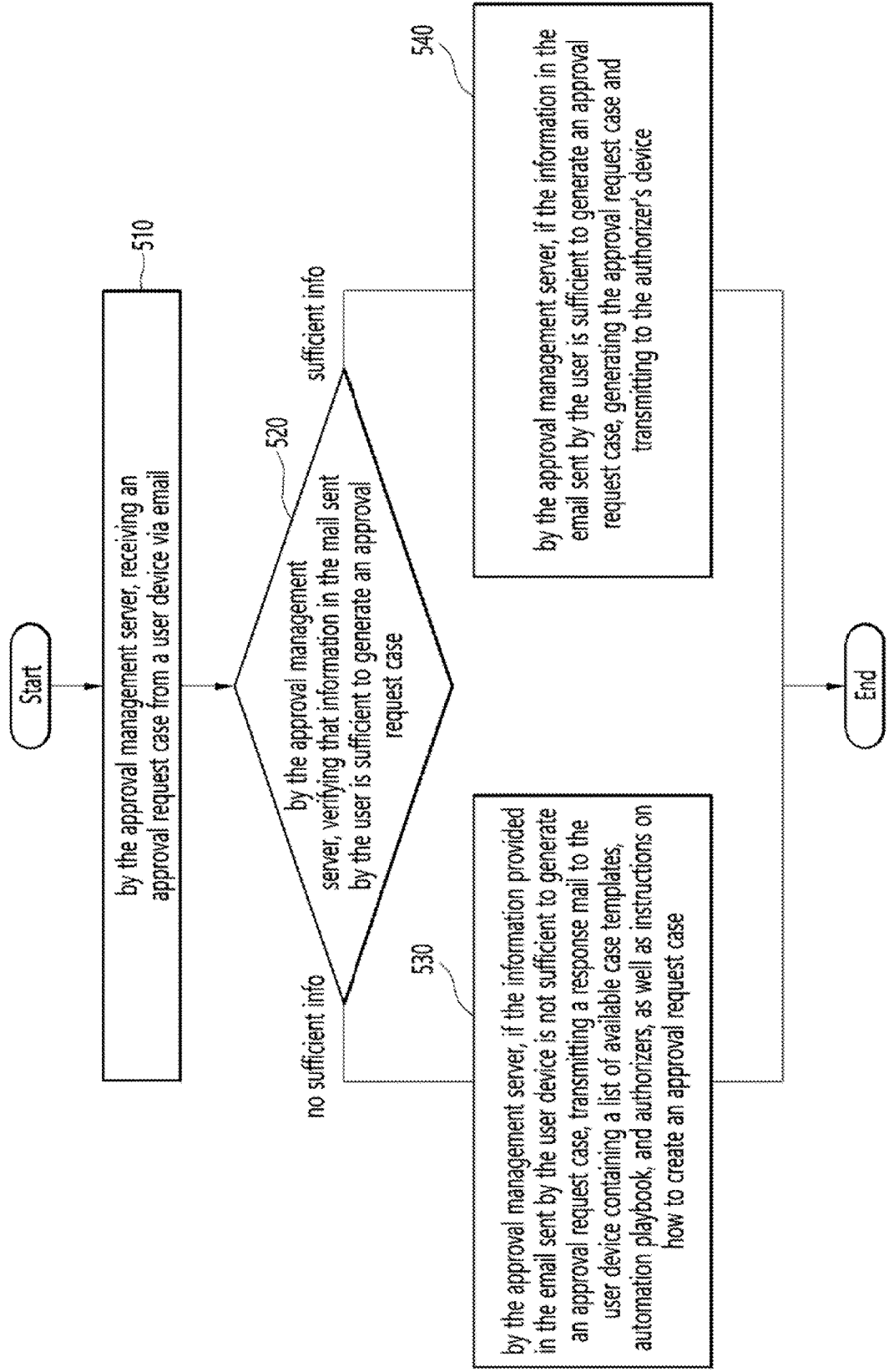

At step 540, the approval management server, upon determining that the information provided by the user is sufficient, can proceed to create an approval request case and send an approval request email to the authorizer's device. The subsequent procedures may follow the same sequence as steps 320 to 360 outlined in FIG. 3. Further details on the interface for the aforementioned approval request case are elaborated from FIG. 6 onwards.

FIG. 6 illustrates the interface on the approval management server for managing approval request case templates. Displayed within the interface are the template number A104, template name A106, template description A108, and template creation date A110. The server's administrator can create new templates via a new template creation menu A102, similar to FIG. 7, and can also modify or delete existing templates through the approval management server interface.

FIG. 7 illustrates an example of creating an approval request case template within the interface of the approval management server. The case number B102 is automatically generated sequentially according to a predetermined case number rule. The requester B104 is the username of the user creating the approval request case and is automatically generated. The authorizer B106 is a selectable menu when the user creates the approval request case. The creation date B108 is automatically entered with the current date. The case template B110 is a selectable menu when the user creates the approval request case according to the intended purpose of approval. The email subject B112 and the email body B114 are fields directly entered by the user when creating the approval request case. In FIG. 7, the selection menu B116 and hyperlink B118 for the approval response menu are automatically generated items based on the selected case template B110. An example of the hyperlink B118 is "approval management server URL+approval request case number+approval response+authorizer's name," which could be, as shown in FIG. 16, "https://rumida.co/?case_num=APR-42&value=Approved&replied=YoungOak_Lee". In this example, "https://rumida.co" represents the URL of the approval management server, "APR-42" is the approval request case number, "Approved" is the approval response, and "YoungOak_Lee" could be the name of the authorizer. The automation playbook selection menu B124 displays the playbook name D104 from FIG. 9 automatically in item B122 when the playbook number D102 pre-created by the administrator of the approval management server in FIG. 9 is selected. The attachment field B126 is a menu where the user can attach files as needed when creating the approval request case.

FIG. 8 presents a list of automation task modules that can be selected when configuring an automation playbook. As depicted in FIG. 8, the list can be stored in memory or a database in a tabular format. The automation task modules created and managed by the administrator of the approval management server may be in the form of scripts or programs. The module number C102 shown in FIG. 8 can be sequentially generated and assigned based on the type of task the module performs. Additionally, the module name C104 may correspond to the name of the module associated with the module number and could be designed for ease of use by the administrator of the approval management server. The automation task C106 may denote the content of the task performed corresponding to the module number C102.

FIG. 9 may represent an automation playbook created by combining the module numbers C102 from the automation task module list depicted in FIG. 8 in a desired sequence. In the table of FIG. 9, the playbook number D102 and the creation date D108 are automatically generated at the time of playbook creation for identification purposes, while the playbook name D104 and playbook description D106 are the titles and details of the playbook's operations, respectively. They may correspond to the playbook name E104 and playbook description E108 entered during playbook creation as exemplified in FIG. 10.

FIG. 10 may serve as an example of creating an automation playbook. As with FIG. 9, the playbook number E102 and the creation date E106 can be automatically generated. The playbook name E104 and playbook description E108 may be entered by the administrator of the approval management server, or they may be generated by the server. The playbook can be executed based on the authorizer's response. For the authorizer's response E110, corresponding response conditions can be input, and for automation tasks E112, necessary module numbers C102 listed in FIG. 8 can be selected and combined as desired to automate the intended tasks. Depending on the module, additional options (as in the case of DF-1 and DF-2) may be selected. The final operation E114 can include tasks that signify what actions are to be performed upon the completion of the work automation E112. The final operation may also be determined by selecting from the module numbers C102 depicted in FIG. 8.

FIG. 11 illustrates a function for managing approval request cases by users through the case management features provided by the approval management server. The case number J102 is automatically sequentially generated as the case number K102 in the approval request case creation example of FIG. 12, and the authorizer's name J104 corresponds to the authorizer K106 in FIG. 12. The case description J106 corresponds to the case description K124 in FIG. 12, and the creation date J108 is derived from the creation date K110 in FIG. 12.

FIG. 12 exemplifies an approval request case composed by a user, where the case number K102 is automatically generated. The requester K104 is the name of the user who is creating the approval request case, automatically displayed. The authorizer K106, case template K108, and automation playbook K120 are selected from items stored in the approval management server, while the mail subject K112, mail body K114, and case description K124 are directly input by the user. The selection menu K116 in the approval response menu and the hyperlink K118 are automatically generated based on the selected case template K108. An attachment K122 is included if there are files necessary for the approval request. The authorizer's response to the approval request is displayed in item K126, and the time of the response is shown in the request result time K128. Changes in the status of the automation task are indicated in item K132 as in progress or completed, and the final task completion time is displayed in the operation time K130.

FIGS. 13 and 14 provide examples of the electronic mail configuration used in approval requests according to the present invention. The composition of the email sent to the authorizer changes depending on the case template K108 selected in FIG. 12. The mail subject K112 and mail body K114 entered in FIG. 12 are displayed as the email subject R102 and email body R104 in FIG. 13, and an instructional note R106 indicating that the authorizer can click on the menu to respond to the approval request is automatically inserted into the email body. The selection menu K116 and hyperlink K118 from the approval response menu in FIG. 12 are displayed in the selection menu R108 of the email body in FIG. 13. Depending on the case template K108 selected in FIG. 12, icons can be displayed in the approval response menu S102 in FIG. 14.

FIG. 15 exemplifies an email body menu provided for the authorizer to select a response to an approval request. The authorizer's selection menu example T102 consists of three options: request approval, request pending, and request denial, with each menu's hyperlink syntax T104 showing what content of hyperlink is inserted for each authorizer selection menu, and each menu's hyperlink example T106 displays an actual example used for experimentation in this invention. FIG. 16 shows an example of the transmission of hyperlink information through a web browser when the authorizer selects an option through input such as clicking on the selection menu example R108 or S102. The web browser confirms that the approval request response has been successfully transmitted and can alleviate the authorizer's inconvenience by immediately closing the web browser through JavaScript functions.

Those skilled in the art of this invention will understand that information and signals may be represented using any of a variety of different technologies and techniques. For example, the data, instructions, commands, information, signals, bits, symbols, and chips that may be referenced throughout the above description might be represented by voltages, currents, electromagnetic waves, magnetic fields or particles, optical fields or particles, or any combination thereof.

Furthermore, those skilled in the art will appreciate that the various illustrative logical blocks, modules, processors, means, circuits, and algorithm steps related to the embodiments disclosed herein could be implemented as electronic hardware, various forms of program or design code (conveniently referred to as software herein), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various embodiments disclosed herein can be implemented as methods, devices, or articles of manufacture using standard programming and/or engineering techniques. The term "article of manufacture" includes any computer-readable storage devices accessible from any computer program, carrier, or media. For example, computer-readable storage media may include, but are not limited to, magnetic storage devices (such as hard disks, floppy disks, magnetic strips, etc.), optical disks (such as compact discs (CDs), digital versatile discs (DVDs), etc.), smart cards, and flash memory devices (such as EEPROMs, cards, sticks, key drives, etc.). Furthermore, the various storage media disclosed herein include one or more devices and/or other machine-readable media for storing information.

The specific order or hierarchy of steps in the processes disclosed should be understood as an example of illustrative approaches. Based on design preferences, it is understood that the specific order or hierarchy of steps in the processes can be rearranged within the scope of the present invention. The attached method claims provide elements of the various steps in a sample order, but are not limited to the specific order or hierarchy presented.

The descriptions provided for the disclosed embodiments are to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a system for managing approval requests using email, comprising:
   generating an approval request case on an approval management server using information provided by a user device;
   by the approval management server, transmitting an approval request to an authorizer device via an email server based on a generated approval request case;
   by the approval management server, receiving a response input from the authorizer and determining whether the input is a request denial, request pending, or request approval;
   by the approval management server, if the result is the request denial, transmitting an email to the user device with a message indicating that the approval request was denied;
   by the approval management server, if the result is a request pending, transmitting an email to the authorizer device at preset intervals with a prompt for approval;
   by the approval management server, if the result received is request approval, transmitting information on the approval of the request to the user device and performing operations corresponding to the automation playbook selected in the approval request case,
   wherein, if the approval management server receives an email approval request case from the user device, a response menu with a hyperlink is generated in the interface displayed on the display of the authorizer device, and the hyperlink is generated in the form of "approval management server URL+approval request case number+approval response+authorizer name",
   by the approval management server, generating an automation playbook for the approval management server to perform operations in response to the email approval request case—the automation playbook consists of a combination of operations for the approval management server to perform;
   by a module managed by an approval management server, generating an interface including a module number, a module name, and an automation task with script language or program generated by an administrator of the approval management server;
   wherein the module is a unit operation that is selected when configuring a playbook, a module number means an identification number entered by an administrator of an approval server or automatically generated by an approval server, and a module name means the name of the unit operation that the module processes;
   wherein an automation is generated by a combination of modules.

2. The method according to claim 1, further comprising:
   by the approval management server, receiving an approval request case via email from the user device;
   by the approval management server, identifying that information in the email sent by the user device is sufficient to generate an approval request case;
   by the approval management server, if the information in the email sent by the user device is not sufficient to generate an approval request case, transmitting a response mail to the user device containing a list of case templates that is used to generate an approval request case, a list of automation playbooks and authorizer, and instructions on how to generate an approval request case;
   by the approval management server, if the information in the email sent by the user device is sufficient to generate an approval request case, generating the approval request case and transmitting to the authorizer device.

3. A method of operating a system for managing approval requests using email, comprising:
   by a second system, transmitting an email approval request to the approval management server as an API message;
   by the approval management server, generating an approval request case based on the approval request and transmitting the approval request case to the authorizer device via an email server;
   by the approval management server, receiving a response input from an authorizer and determining whether the response input is a request denial, request pending, or request approval;
   by the approval management server, if the result is the request denial, transmitting an email to the user device with a message indicating that the approval request was denied;

by the approval management server, if the result is a request pending, transmitting an email to the authorizer's device at preset intervals with a prompt for approval;

by the approval management server, if the result received is request approval, transmitting information on the approval of the request to the user device and performing operations corresponding to the automation playbook selected in the approval request case, wherein, if the approval management server receives an email approval request case from the user device, a response menu with a hyperlink is generated in the interface displayed on the display of the authorizer device, and the hyperlink is generated in the form of "approval management server URL+approval request case number+approval response+authorizer name", by the approval management server, generating an automation playbook for the approval management server to perform operations in response to the email approval request case—the automation playbook consists of a combination of operations for the approval management server to perform;

by a module managed by an approval management server, generating an interface including a module number, a module name, and an automation task with script language or program generated by an administrator of the approval management server;

wherein the module is a unit operation that is selected when configuring a playbook, a module number means an identification number entered by an administrator of an approval server or automatically generated by an approval server, and a module name means the name of the unit operation that the module processes;

wherein an automation is generated by a combination of modules.

4. A system for managing approval requests using email, a user device;

an authorizer device;

an approval management server; and wherein:

the approval management server generates an approval request case on an approval management server using information provided by a user device;

the approval management server transmits an approval request to an authorizer device via an email server based on a generated approval request case;

the approval management server receives a response input from the authorizer and determining whether the input is a request denial, request pending, or request approval;

if the result is the request denial, the approval management server transmits an email to the user device with a message indicating that the approval request was denied;

if the result is a request pending, the approval management server transmits an email to the authorizer's device at preset intervals with a prompt for approval;

if the result received is approval of the request, the approval management server transmits information on the approval of the request to the user device and performing operations corresponding to the automation playbook selected in the approval request case, wherein, if the approval management server receives an email approval request case from the user device, a response menu with a hyperlink is generated in the interface displayed on the display of the authorizer device, and the hyperlink is generated in the form of "approval management server URL+approval request case number+approval response+authorizer name", by the approval management server, generating an automation playbook for the approval management server to perform operations in response to the email approval request case—the automation playbook consists of a combination of operations for the approval management server to perform;

by a module managed by an approval management server, generating an interface including a module number, a module name, and an automation task with script language or program generated by an administrator of the approval management server;

wherein the module is a unit operation that is selected when configuring a playbook, a module number means an identification number entered by an administrator of an approval server or automatically generated by an approval server, and a module name means the name of the unit operation that the module processes;

wherein an automation is generated by a combination of modules.

* * * * *